United States Patent [19]

Kern et al.

[11] Patent Number: 5,718,441
[45] Date of Patent: Feb. 17, 1998

[54] DISPLAY CART

[75] Inventors: Alan R. Kern; John A. LaFleur, both of Richmond; Bradley Dean Miller, Glen Allen; Scottlan R. Henry, Richmond, all of Va.

[73] Assignee: Rehrig International, Inc., Richmond, Va.

[21] Appl. No.: 574,188

[22] Filed: Dec. 18, 1995

[51] Int. Cl.⁶ .................................. B62B 3/02; B62B 3/16
[52] U.S. Cl. .................... 280/79.3; 211/187; 211/188; 280/33.998
[58] Field of Search .................... 280/79.3, 47.34, 280/47.35, 79.11, 33.997, 33.998; 211/126, 128, 187, 188, 189, 153, 194, 198, 206, 208

[56] References Cited

U.S. PATENT DOCUMENTS

| | | |
|---|---|---|
| 1,462,370 | 7/1923 | Vance. |
| 2,011,357 | 8/1935 | Ford. |
| 2,827,302 | 3/1958 | Skyrud. |
| 3,007,708 | 11/1961 | Ochs .................. 280/79.3 |
| 3,523,694 | 8/1970 | Oliver ................ 280/33.998 |
| 3,608,920 | 9/1971 | Rubin ................. 280/33.99 |
| 3,915,097 | 10/1975 | Young, Jr. ............. 211/178 |
| 3,977,529 | 8/1976 | Stroh .................. 211/187 |
| 3,986,462 | 10/1976 | Heft ................... 211/188 |
| 4,045,043 | 8/1977 | Fourrey ................ 280/79.3 |
| 4,391,378 | 7/1983 | Secon .................. 211/188 |
| 4,650,199 | 3/1987 | Rehrig ................ 280/33.997 |
| 4,725,066 | 2/1988 | Noonenboom et al. ..... 280/79.3 |
| 4,890,748 | 1/1990 | Visser ................. 211/153 |
| 5,160,052 | 11/1992 | Wudka .................. 211/90 |

OTHER PUBLICATIONS

Wellmaster Greenhouse Equipment brochure (3 pages).
Cannon Equipment brochure.
Karsten Metal, Inc. "Plant Mover Systems" brochure.
"The Cart System" brochure.

*Primary Examiner*—Anne Marie Boehler
*Attorney, Agent, or Firm*—Bacon & Thomas

[57] ABSTRACT

A transport and display cart is formed of light weight plastic and metal components including a base unit formed from an open framework in which is disposed and fastened a molded plastic tray. Wheels preferably including casters are provided on the underside of the base unit and opposed ladder units having horizontal bars or rungs are removably connected to opposed ends of the base unit by fitting within post supports rigidly connected to the base unit. Upper shelves include plastic trays that are constructed identical to the tray connected to the base unit and reinforcing rods having downwardly open jaws or hooks at their opposed ends for engaging the horizontal rungs or bars of the opposed ladder units. The upper shelves can be selectively disposed in horizontal or tilted positions simply by hooking the ends of the reinforcing rods over different rungs of the ladder units.

11 Claims, 11 Drawing Sheets

DISPLAY CART

BACKGROUND OF THE INVENTION

1. Field Of the Invention

This invention relates to a display cart for transporting and displaying items for retail merchandising.

2. Description of the Prior Art

Display carts for transporting and placing items to be offered for sale in a retail environment are well known. These types of carts offer distinct advantages in that merchandise to be openly displayed such as, for example, plants and flowers, can be loaded on to a mobile cart at one merchandising establishment such as a nursery, transported to a retail establishment where they are to be offered for sale and then left on the cart for access by customers. The merchandise can be moved about the retail establishment as well with such a cart.

Prior art display carts, however, tend to be costly and difficult to maintain due to their construction. In particular, prior art carts are typically made of painted or coated sheet metal or wire components that tend to chip, dent and rust so that after a period of use they cease to be attractive. Such metal carts also tend to be rather heavy and can be difficult to maneuver by retail personnel. Prior art carts, moreover, utilize a shelving system that requires the use of rather heavy shelving elements that are made of painted or coated metal, wire or other like materials that offer various disadvantages during use of the display cart.

Prior art transport and display carts tend to use different shelf constructions for the bottom shelf associated with the base of the cart and the upper shelves located above the base. This results in manufacturing and inventory inefficiencies due to the need to manufacture and inventory different types of shelving.

Accordingly, there exists a need for a merchandise transport and display cart formed of lightweight material having sufficient strength to support the retail merchandise to be displayed while avoiding the disadvantages associated with painted or coated metal or wire shelving. There also exists a need to obtain a cart that is low in cost, relatively lightweight and yet sturdy enough to meet the demands of daily use in a retail environment. There also exists a need in the field of merchandise transport and display carts for a structural assembly that enables the use of a single modular tray that can be used in common with the bottommost shelf associated with the base of the cart and the shelves located above the base.

SUMMARY OF THE INVENTION

This invention provides a transport and display cart for merchandise to be offered for sale in a retail environment or the like that is formed of a combination of plastic and lightweight metal components. More specifically, the cart comprises a base unit including a structural framework arranged in a geometric pattern preferably lying in a substantially single plane, with the pattern providing a central opening in the base unit. Wheels including casters are connected to the underside of the base unit and post supports are secured at the opposed ends of the base unit framework. At least according to one embodiment of the invention, the base unit is constructed such that similarly constructed base units can be stacked upon each other to minimize required storage or transport space. A plastic tray member having opposed integral side portions is geometrically configured to fit within the base unit opening with the side portions of the tray engaging the opposed sides of the base unit framework. Fasteners are used to secure the tray to the adjacent sides of the base unit framework to form the bottommost shelf of the cart.

A pair of ladder units for supporting additional shelves on the cart are formed of spaced vertical posts and horizontal bar or rung elements rigidly connected to and extending between the posts. Each of the spaced vertical posts can be formed by a single elongate member or multiple interconnected elongate members and are preferably tubular. The posts are removably received by the post supports of the base unit in opposed relationship.

The additional shelves above the base unit are formed of plastic trays that are substantially or exactly identical to the plastic tray member associated with the base unit as the bottom shelf. Each additional plastic tray forming a shelf is secured to a pair of metallic tray support rods rigidly connected to and extending along the opposed side portions of the additional plastic tray. The rods include hooked end portions having geometric configurations suitable for enabling the end portions to vertically engage and slide over the bars or rungs of the opposed ladder units so that the bars or rungs and their associated trays (i.e., the shelves) can be readily raised from or lowered upon the bars or rungs of the ladder units. The rods also reinforce the plastic trays against vertical deflection.

The upper shelves, accordingly, can be secured to the horizontal bars of the ladder units with the shelves selectively positioned in either horizontal or tilted positions by simply adjusting the respective horizontal bars engaged by the hooked-ends of the rods associated with the shelves.

This construction provides a relatively rigid yet lightweight construction wherein all of the plastic trays forming shelves of the cart can be molded within the same set of dies in an injection molding machine or the like to effect substantial cost savings and reduced inventory. Preferably, the trays are nestable for convenience of storage and to minimize the amount of space required to house the cart when transporting the cart during unloaded conditions. The metal framework preferably is made of extruded tubular aluminum that may or may not be painted or coated. The rods extending along the side of the upper trays serve as reinforcements for the plastic trays so that the amount of plastic material utilized to form each tray can be kept at a minimum to effect further cost savings.

Additional objects, features and advantages of the present invention will be more readily apparent from the following description of the preferred embodiment thereof, when taken in conjunction with the following drawings wherein like reference numerals refer to corresponding parts in the several views.

DETAILED DESCRIPTION OF THE DRAWINGS

DETAILED DESCRIPTION OF THE PREFERRED EMBODIMENTS

Figure 1:
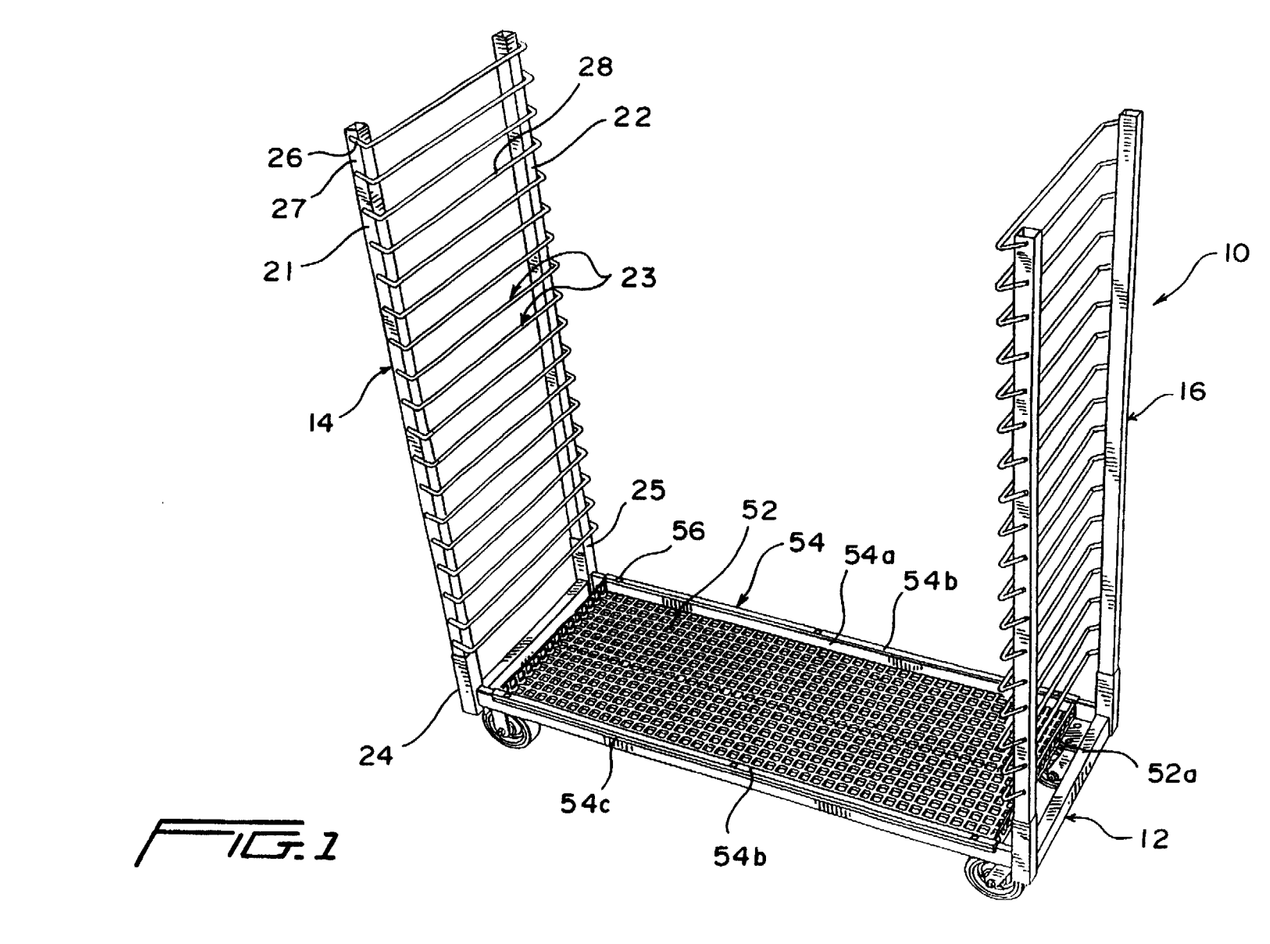
FIG. 1 shows a perspective view of a transport and display cart constructed in accordance with a first embodiment of the present invention without upper shelves illustrated.

With initial reference to FIG. 1, the cart 10 according to a first embodiment of the invention includes a generally rectangular base unit 12, a first ladder unit 14 removably mounted at one end of the base unit 12 and a second ladder unit 16 mounted at the other opposed end of the base unit 12.

The ladder units 14, 16 are identical in accordance with the preferred embodiment of the invention. Each ladder unit 14, 16 comprises two spaced upstanding posts 21, 22 and a plurality of vertically spaced horizontal bars or rungs 23. The upstanding posts 21, 22 are adapted to be received and to slidably fit within corner post sockets or supports 24, 25 respectively on the base unit 12. The post supports 24, 25 preferably are formed of elongated extruded aluminum tubes having, for example in this embodiment, square cross-sections. Of course, other structural material may be utilized to form the post supports 24, 25.

Upstanding posts 21, 22 also may have any desired cross-section and may be made from any appropriate material provided that they have sufficient strength and rigidity to support the shelves of the shelving assembly that will be described below. Moreover, the corner post supports 24, 25, while illustrated as receiving the upstanding posts 21, 22 in a male to female fit relationship, may be dimensioned and configured so that the upstanding posts 21, 22 are received in a female to male relationship, i.e., the reverse of the relationship as illustrated. In general, the post supports 24, 25 need only be provided with appropriate cross-sectional dimensions and geometrical configurations such that they can receive and support the upstanding posts 21, 22 in an interlocking relationship in accordance with the invention.

The horizontal bars or rungs 23 are each attached to their respective posts at their ends and extend between the posts 21, 22. Each bar or rung 23 includes an end portion 26 that enables the bars 23 to be welded or otherwise secured in an appropriate rigid manner to an outer surface 27 of a respective post 21, 22 to provide a strong yet relatively inexpensive construction. As clearly shown in this Figure, end portion 26 of each bar 23 is secured to a respective outer surface 27 such that the end portion 26 is angled downwardly and central portion 28 of the bar or rung 23 is slightly spaced from a vertical plane including the posts 21, 22. As will become clearly evident from the following description, this construction prevents shelves supported on the various bars 23 from being unintentionally disengaged.

Figure 2:
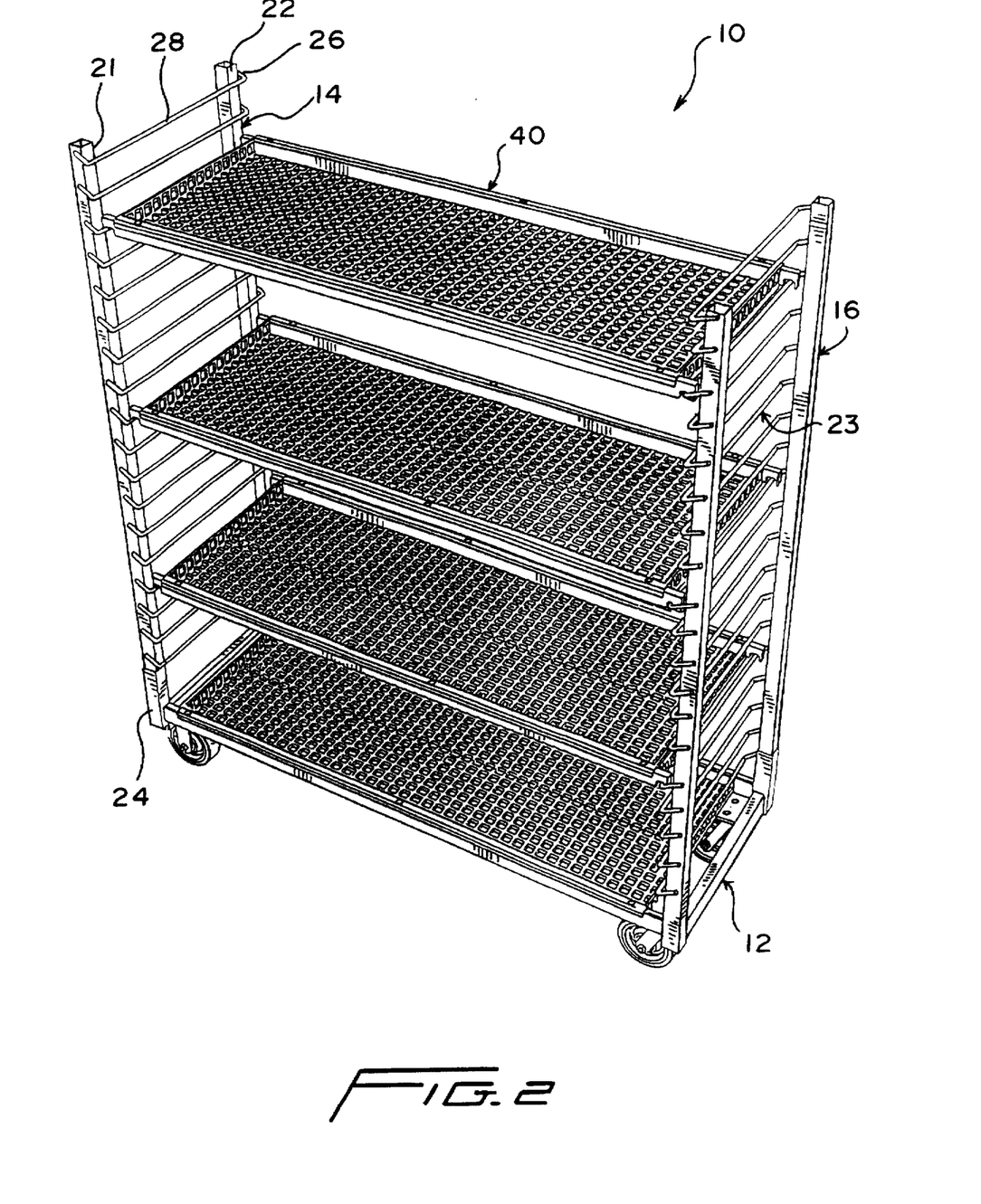
FIG. 2 shows a perspective view of the cart of FIG. 1 with a plurality of upper shelves supported thereon in generally horizontal planes spaced vertically apart.
Figure 3:
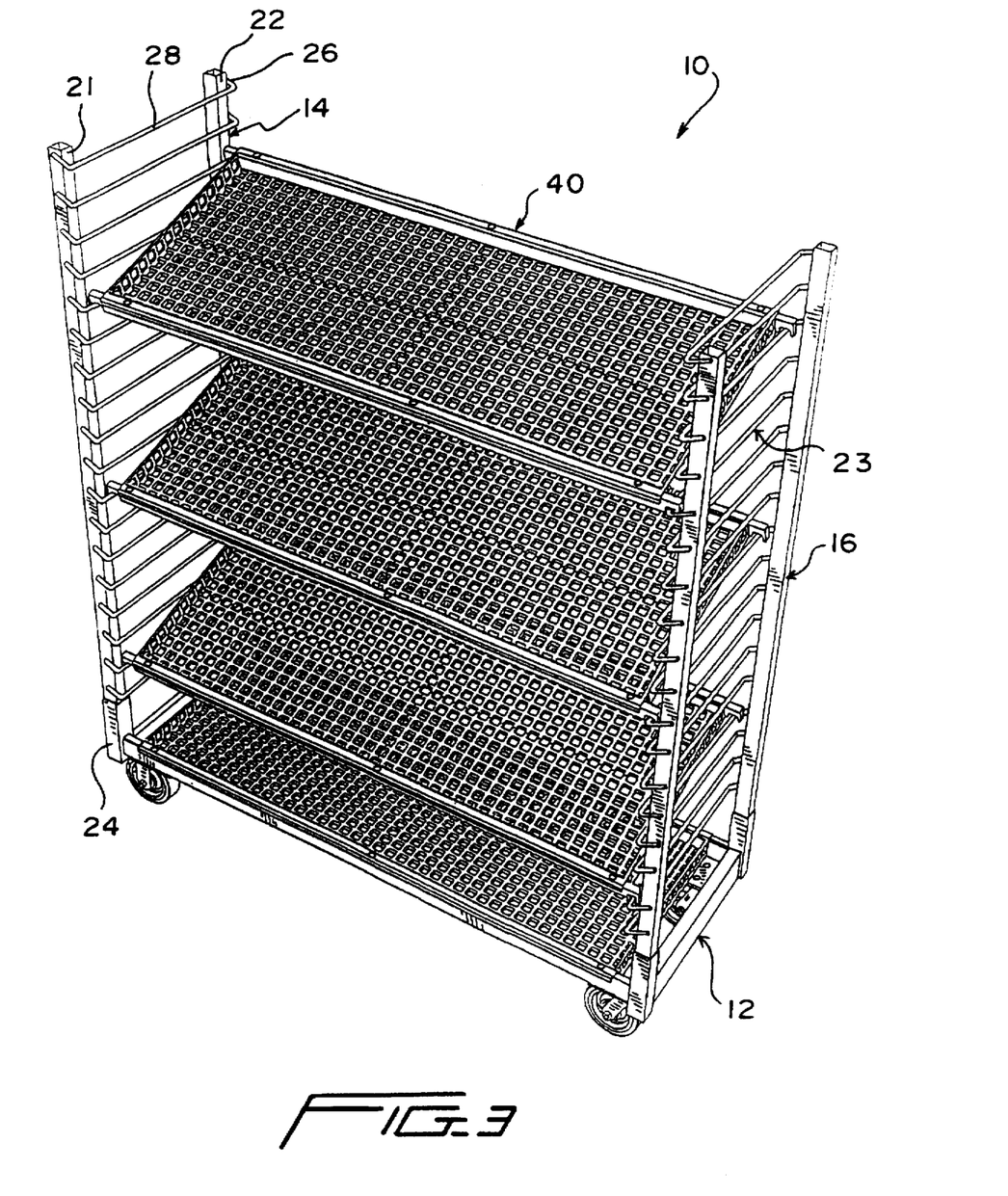
FIG. 3 shows a perspective view of the cart with the upper shelves in tilted positions.

A cart 10 constructed in accordance with the invention is illustrated in FIGS. 2 and 3 with additional shelves 40 disposed above the base unit 12. The shelves 40 may be oriented in substantially horizontal planes as shown in FIG. 2, or can be arranged so that they tilt forwardly to enhance the display of merchandise as illustrated in FIG. 3. In accordance with the invention, merchandise can be placed upon the shelves 40 in their horizontal positions for the purpose of transporting merchandise from one location to another, and thereafter the shelves can be readily inclined as shown in FIG. 3 for display purposes. The manner in which the shelves cooperate with the bars 23 of the ladder units 14, 16 will be described in more detail below in conjunction with the description of the individual shelves 40.

Figure 4:
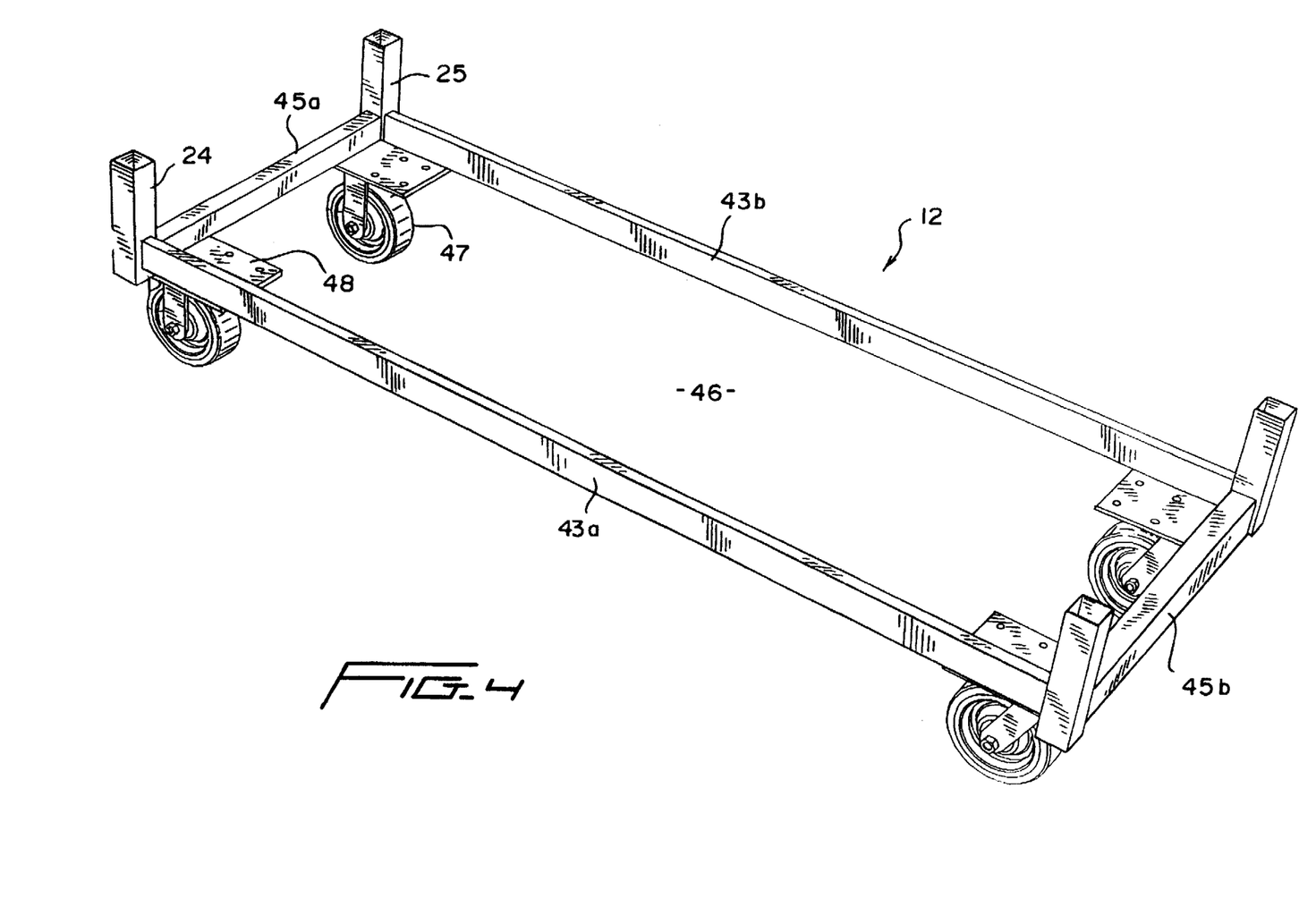
FIG. 4 is a perspective view of the preferred framework forming the base of the FIG. 1 cart.
Figure 9:
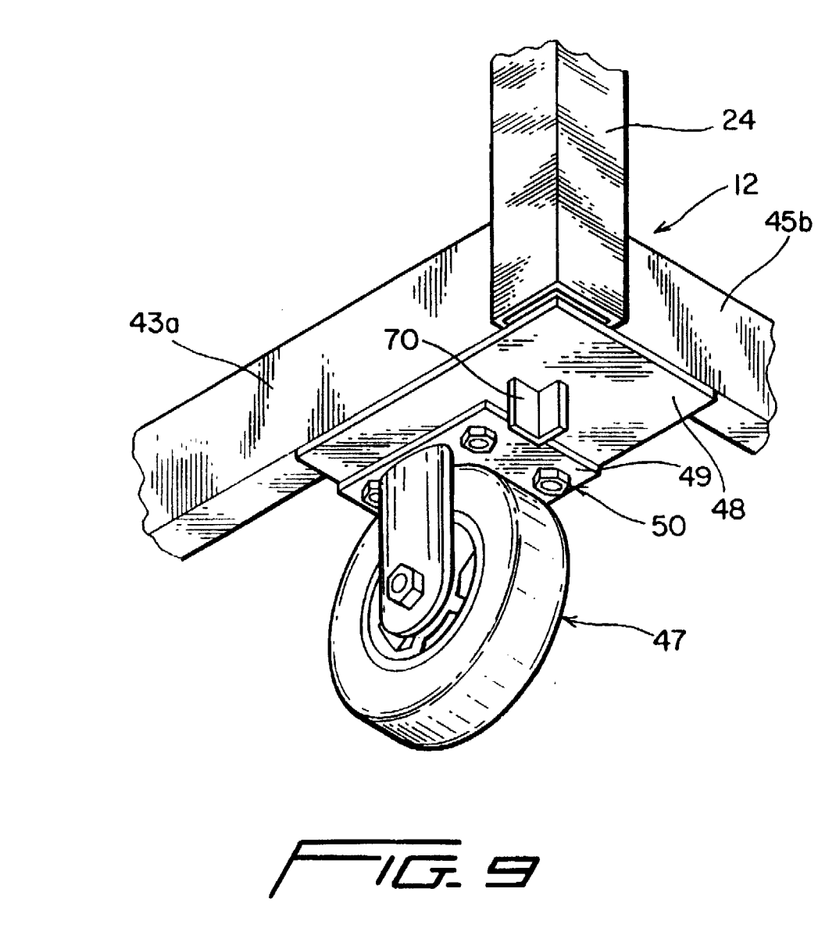
FIG. 9 is partial section view of a corner portion of the base of FIG. 4.

The base 12 of the cart is illustrated in FIG. 4 and comprises a structural framework of tubular elements 43a, 43b constituting the opposed sides of the framework and tubular elements 45a, 45b forming the opposed ends of the framework. The various tubular elements 43, 45 are secured together by welding or other suitable means so that they form a rigid structural framework preferably lying in a single plane and leaving an opening 46 within the interior of the framework. Wheels 47, although not clearly shown in the drawings, preferably define casters on at least one end of cart 10 and are secured to the underside of the framework by respective mounting plates 48 which are preferably welded to both tubular elements 43 and 45 while extending below at least a portion of a respective post support 24, 25 in order to substantially close the open, bottom ends of post supports 24 and 25 as best shown in FIG. 9. Actually each wheel 47 includes a mounting plate 49 which is fixedly secured to a respective plate 48 by means of nut and bolt assemblies generally indicated at 50 in FIG. 9. Obviously, positioning plates 48 across the open bottom ends of post supports 24 and 25 functions to limit the degree of vertical sliding of upright ladder posts 21 and 22 within the post supports 24 and 25. Of course, any suitable equivalent means can be provided for limiting the vertical movement of the vertical posts 21 and 22 of each ladder unit 14, 16 relative to a respective post support 24, 25.

As illustrated in FIG. 1, a first or bottom plastic tray 52 includes opposed integral side longitudinal portions 54 and is configured to fit within the opening 46 of base unit 12. In the preferred embodiment, each of the longitudinal sides 54 of tray 52 actually includes an upstanding side section 54a, a horizontal section 54b and a downwardly extending flange section 54c. With this construction, side portions 54 overlay and are preferably wrapped over the upper surface of the tubular elements 43, 45. The side portions 54 of the first or bottom plastic tray 52 are rigidly secured at spaced intervals to the side elements 43a and 43b of base unit 12, for example, by the use of rivets or other fasteners 56. The bottom plastic tray 52 thus tends to further reinforce the rigidity of the base unit 12 and provides a bottom shelf for the cart 10.

Figure 5:
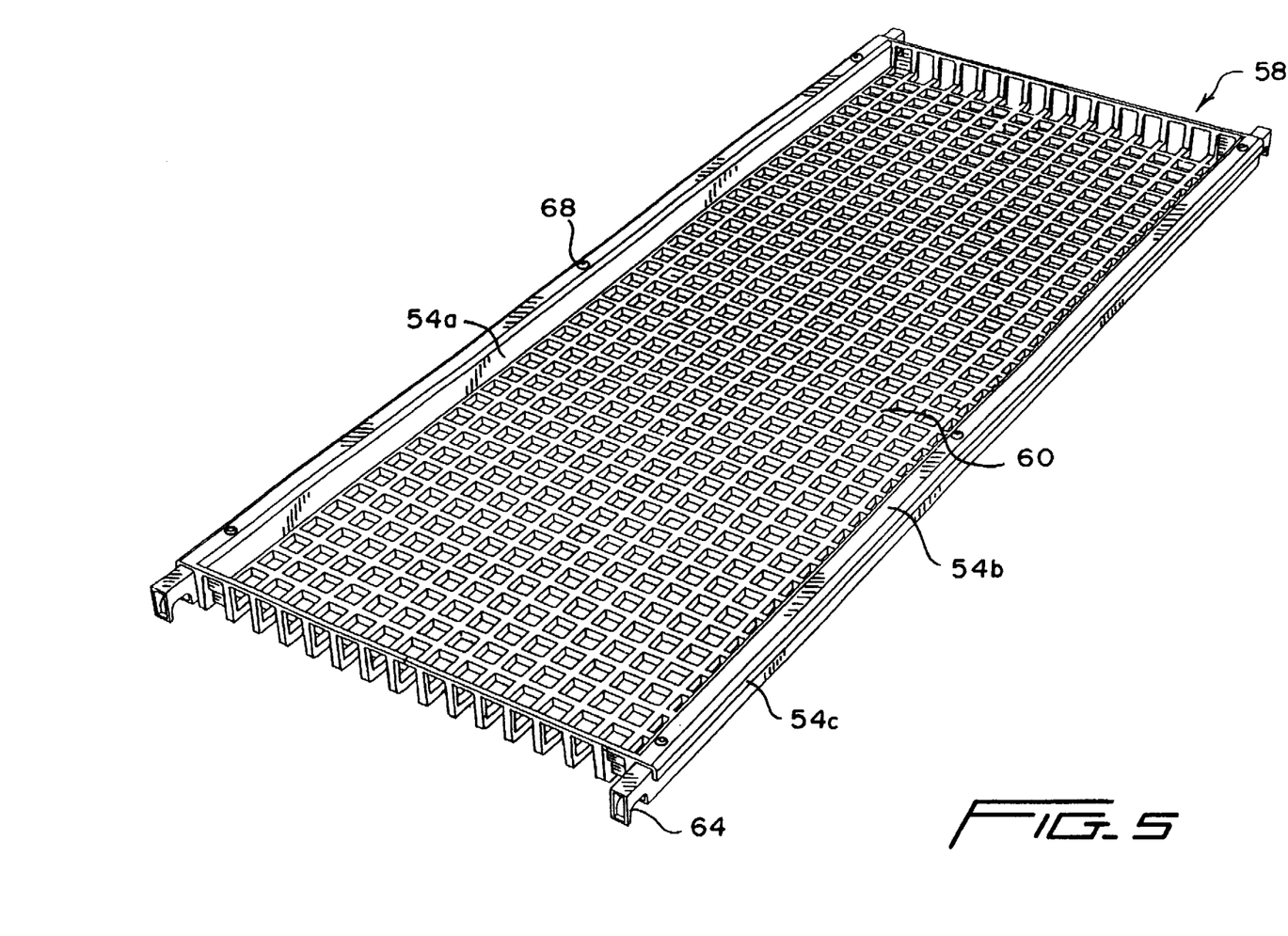
FIG. 5 shows a perspective view of an upper shelf of the FIG. 1 cart.
Figure 6:
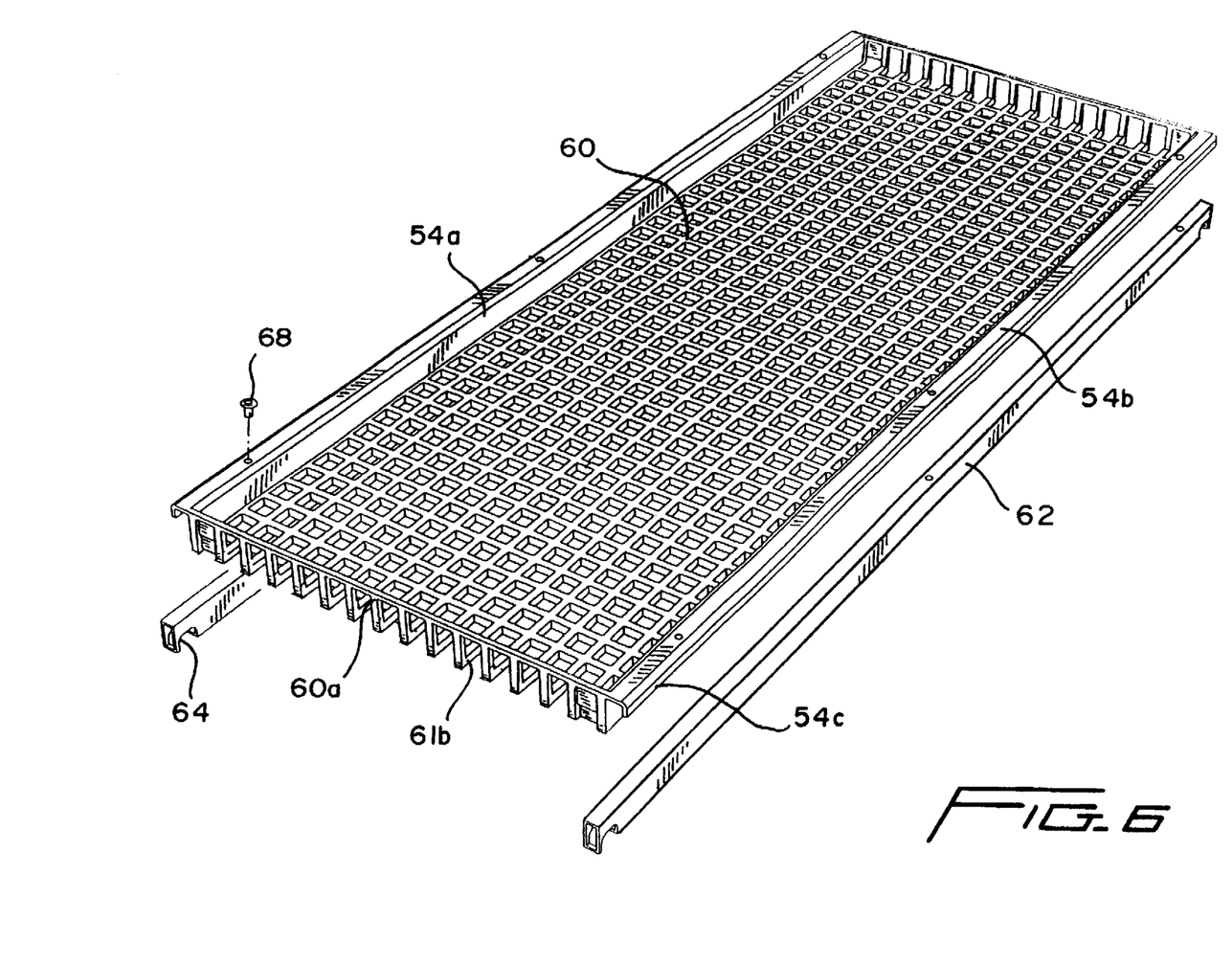
FIG. 6 shows an exploded view of the shelf of FIG. 5.
Figure 7:
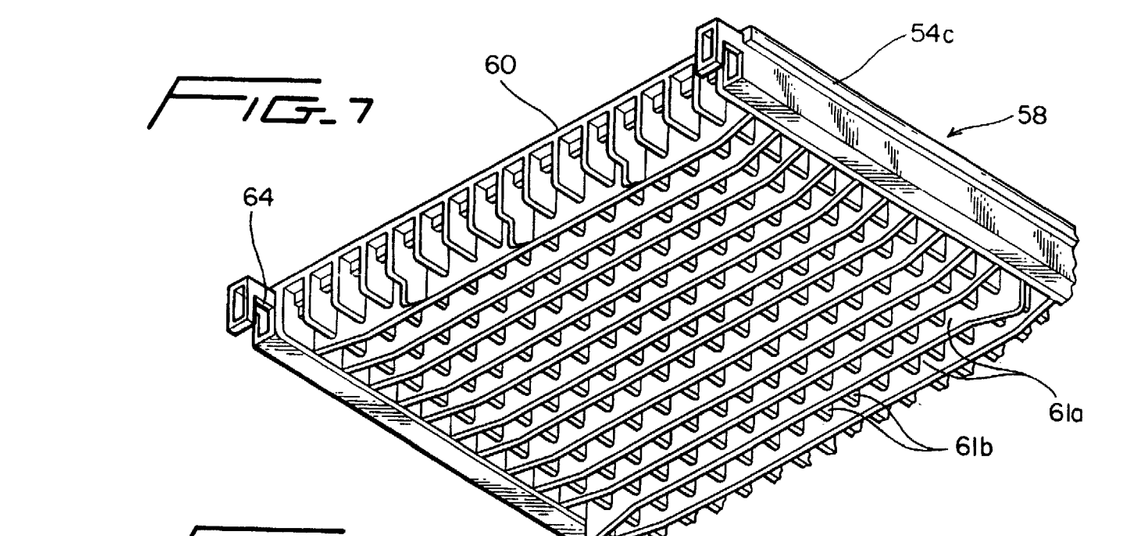
FIG. 7 is a perspective view of a bottom portion of the shelf of FIG. 5.
Figure 8:
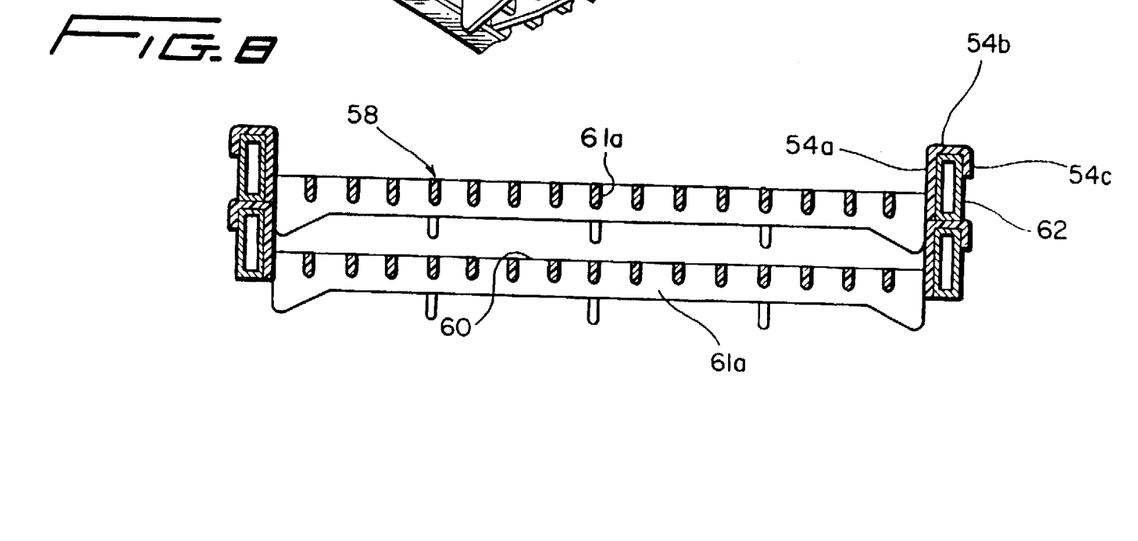
FIG. 8 is a cross-sectional view illustrating the stacking of multiple trays constructed in the manner illustrated in FIG. 5.

A typical upper shelf 58 is illustrated in FIGS. 5 and 6 and includes a plastic tray 60 that is at least substantially and preferably exactly identical to the construction of tray 52 associated with the base unit 12 and therefore like reference numerals have been used to identify corresponding parts. That is, the trays are sufficiently identical so they can be molded by using a common die or set of dies during production and can be interchangeable with each other. The plastic trays are preferably formed of injection molded plastic and are apertured or honeycombed to provide a lightweight yet rigid construction that permits circulation of air and drainage of fluids relative to the bottom of the tray. This honeycombed structure can be provided in various ways but preferably with intersecting transverse walls 61a interconnected by longitudinally extending and transversely spaced segments 61b as best shown in FIG. 8.

Upper shelves 58 also include a pair of opposed tray support rods 62, dimensioned so as to be slightly smaller in width and geometry to the transverse widths of horizontal sections 54b yet which conform in width and geometry to tubular elements 43a, 43b to enable interchangeability of trays 52 and 60. The rods 62 preferably are formed of extruded aluminum but could also be formed of plastic or other suitable material and include cutout notches 64 at their opposed ends that form downwardly opening jaws or hooks for engaging a selected horizontal bar 23 of the ladder units. Of course, the rods 62 could have any desired cross-section configuration and the notches 64 could be formed in any appropriate manner that would provide the ability to hook the ends of rods 62 over an appropriate horizontal bar 23 of a respective ladder unit 14, 16 without requiring any separate connector element.

The horizontal sections 54b of tray 60 engage and are rigidly secured to a respective rod 62, such as, for example, by rivets 68. It will be noted that the plastic trays 52, 60 preferably include upright closed end portions 52A, 60A in accordance with the preferred embodiment of the invention. While the horizontal sections 54b of the trays 52, 60 are shown extending horizontally above the frame member 43 and the rods 62, it is to be understood that any other appropriate arrangement could be utilized whereby the side portions of the plastic trays are rigidly secured to their respective frame and rod elements. In addition it should be noted that the plastic trays 52, 60 can be injection molded as a single piece or as multiple sections that can be joined to form a tray in a shelf assembly or as a bottom tray associated with the framework of the base unit 12. The trays 60 include bottom portions that extend below the top portion of support rods 62, as shown in FIGS. 5 and 6.

Figure 10:
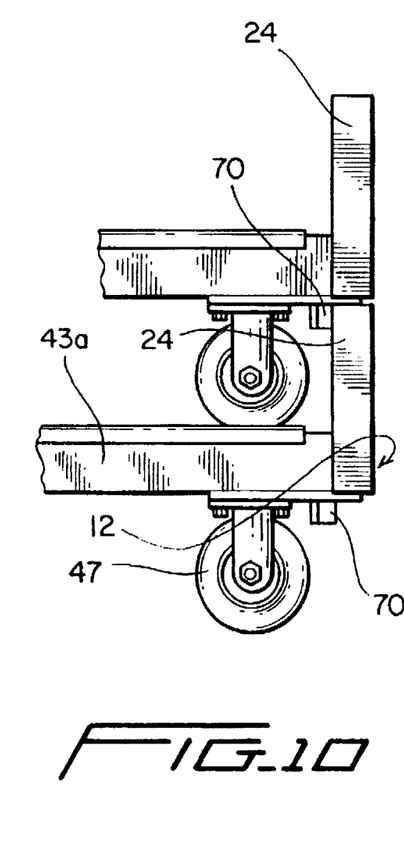
FIG. 10 is a side view of end sections of two bases, constructed in accordance with the first embodiment, shown in a stacked configuration.

In use, the transport and display carts 10 can be shipped and stored in a knock-down condition, that is with the ladder units 14, 16 removed from their supports 24, 25 and disposed horizontally on top of the base unit, with the shelves stacked onto the assembly. Alternatively, the ladder unit 14, 16 and the shelves can be shipped separately in their respective container or containers. Actually, the various shelves 40 are stackable in the manner illustrated in FIG. 8 to minimize the required transporting spaced and undesirable relative shifting. In addition, multiple base units 12 can be readily stacked as shown in FIG. 10 due to the presence of an angle bracket 70 attached to each mounting plate 48 (also see FIG. 9). Each angle bracket 70 is located slightly inwardly of a respective post support 24, 25 such that when successive base units 12 are stacked as shown in FIG. 10, the stacked based units 12 are located relative to each other and undesired movement therebetween is minimized.

Upon arrival at the point of use, the ladder units can be slipped into their respective post supports 24, 25 and the upper shelves 60 can be disposed on the spaced bars 23 of the ladder units 14, 16 at any desired height. The shelves 40 may be disposed in a single, generally horizontal plane by hooking the notches 64 of the rods 62 over bars 23 in the same horizontal plane as shown in FIG. 2 or the shelves 40 may be tilted forwardly by raising the rear rod 62 thereof upwardly to engage horizontal bars 23 that are in a higher vertically spaced horizontal plane relative to the horizontal bars 23 engaged by the forward rod 62 of the shelf 40 as shown in FIG. 3. The simple hooking arrangement provided by the notches 64 of rods 62 permits ready adjustment and movement of the upper shelves relative to the ladder units 14, 16.

Figure 11:
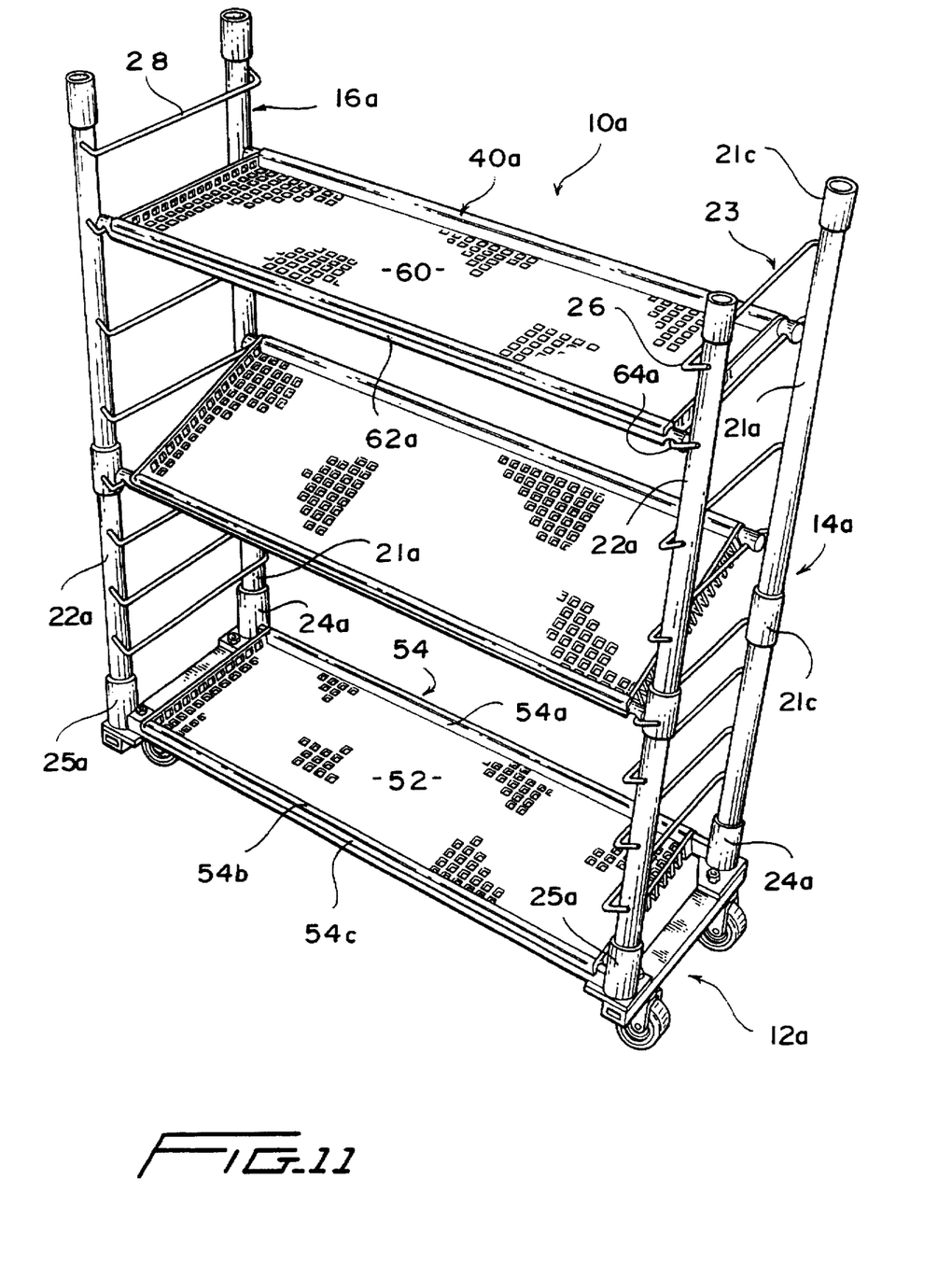
FIG. 11 is a perspective view of a second transport and display cart embodiment in accordance with the invention.
Figure 12:
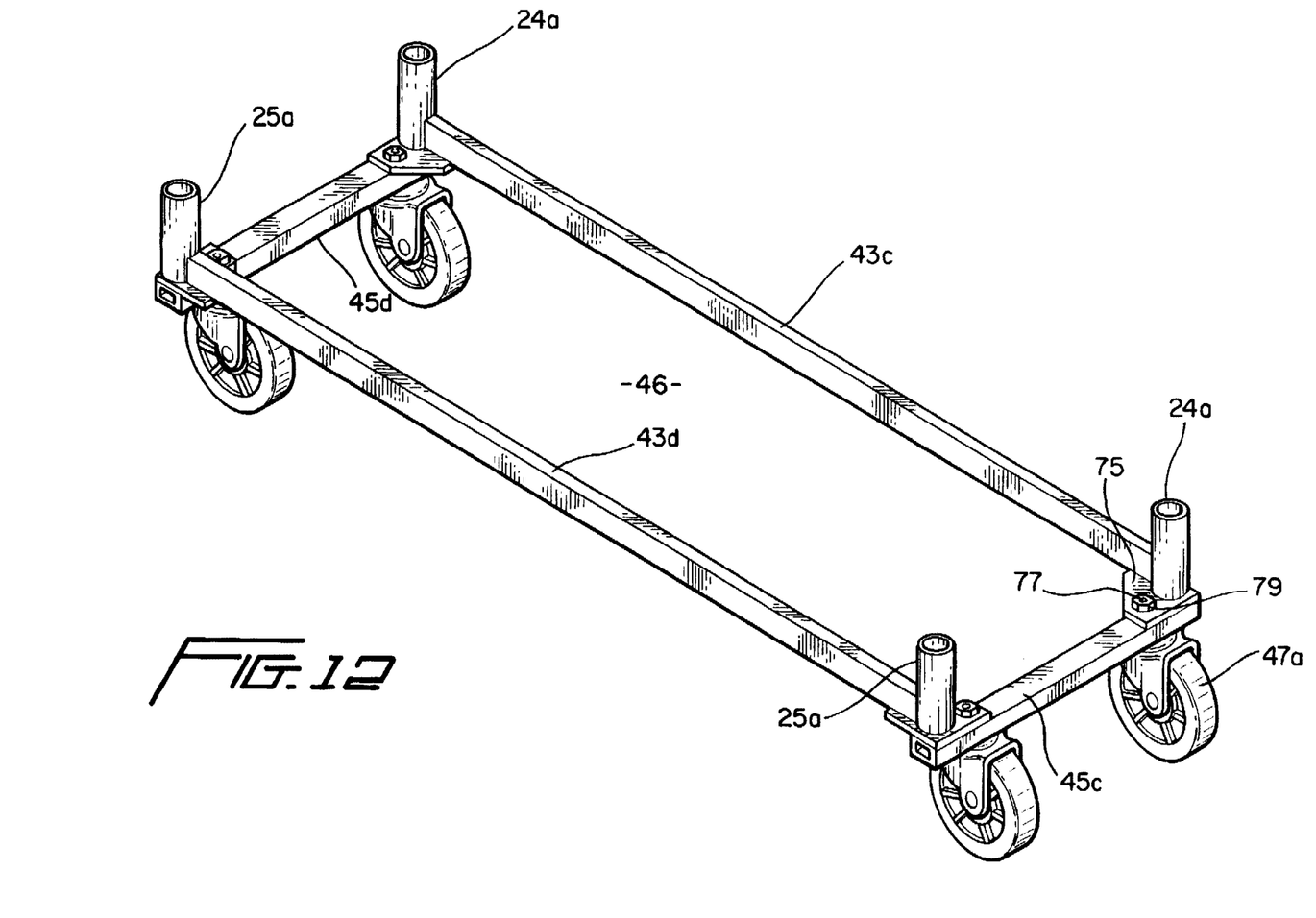
FIG. 12 is a perspective view of the framework forming the base of the cart of FIG. 11.
Figure 13:
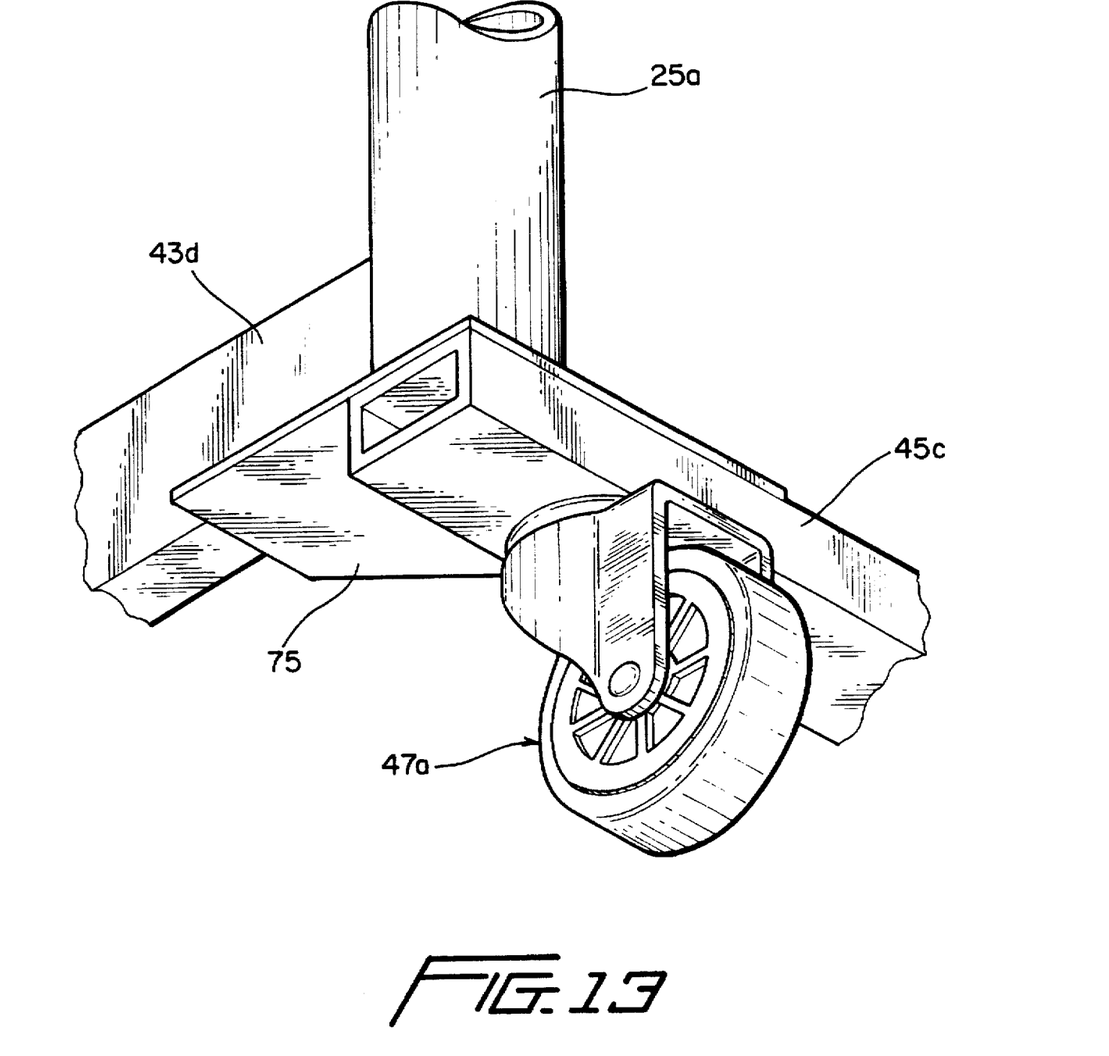
FIG. 13 is a partial section view of a corner portion of the base of FIG. 12.

FIGS. 11–13 depict a second cart embodiment constructed in accordance with the present invention as is generally indicated at 10a in FIG. 11. Since the general overall construction of cart 10a and the manner in which it is used is commensurate with the description given above with respect to cart 10, like reference numerals have been used in FIGS. 11–13 to refer to corresponding parts shown in the embodiment described above with reference to FIGS. 1–10 and these identical parts will not be re-described here. However, the embodiment of FIGS. 11–13 does incorporate a few significant modifications from the embodiment of FIGS. 1–10 as will be fully described below.

With initial reference to FIG. 11, cart 10a includes a base unit 12a to which a pair of spaced ladder units 14a and 16a are removably attached. Each ladder unit 14a and 16a is actually comprised of a plurality of interconnected ladder sub-units with each of the sub-units including a pair of spaced upstanding posts 21a and 22a which are interconnected by respective horizontal bars 23, as well as tubular end connectors 21c which are fixedly secured by welding or the like at the upper end of each upstanding post 21a and 22a. With this arrangement, one or more ladder sub-units can be provided on each side of base unit 12a with the respective upstanding posts 21a and 22a of an upper ladder sub-unit being received within the end connectors 21c of a lower ladder sub-unit provided on the same side of base unit 12a. In the embodiment shown in FIG. 11, two ladder sub units are interconnected with each other at each end of base unit 12a.

In the embodiment depicted in FIG. 11, upstanding posts 21a and 22a are preferably formed of tubular metal, as are end connectors 21c, such that these components are lightweight and can be readily interconnected. In order to connect upstanding posts 21a and 22a to base unit 12a, base unit 12a is provided with corner post sockets illustrated at 24a and 25a at each end of base unit 12a. Corner post sockets 24a and 25a are substantially identical to end connectors 21c. The particular arrangement of corner posts 24a and 25a in relation to the remainder of base unit 12a will be more fully described below with reference to FIGS. 12 and 13.

As with the embodiment described above, the display cart 10a illustrated in FIG. 11 is provided with a plurality of shelves 40a. Each shelf 40a includes a tray 60 that is formed identical to base tray 52 and therefore includes longitudinal sides 54, each of which is defined by an upstanding side section 54a, a horizontal section 54b and a downwardly extending flange section 54c. Base tray 52 is mounted to base unit 12a in the manner commensurate with that described above with respect to the first embodiment of the invention and each tray 60 is secured to a pair of support rods 62a so is to define a respective shelf 40a. In this embodiment, however, support rods 62a are circular in cross-section and notches 64a are formed in the end portions of support rods 62a for supporting the shelves 40a on respective horizontal bars 23 in the same manner as described above. Since the manner in which cart 10a is utilized to transport and display items is identical to that described above with respect to the first embodiment of the invention, this description will not be reiterated here.

Reference will now be made to FIGS. 12 and 13 in describing the construction of base unit 12a. According to this preferred embodiment, base unit 12a includes a pair of spaced tubular elements 43c and 43d that constitute the opposed sides of the base unit 12a, as well as tubular elements 45c and 45d which form the opposed ends of the base unit 12a. As with the first embodiment, tubular elements 43c, 43d, 45c and 45d are preferably rectangular in cross-section, however, other cross-sectional geometries could readily be utilized. For ease of assembly, each tubular element 43c and 43d are rigidly attached to a respective pair of the corner post sockets 24a and 25a, as well as a mounting plate 75. Therefore, each tubular element 43c and 43d is integral with a pair of corner post sockets 24a or 25a respectively, as well as a pair of mounting plates 75 which extend below the respective tubular element 43c, 43d and which also close off the ends of the respective corner post sockets 24a and 25a. In the preferred embodiment, since all of these members are preferably formed from metal, they are preferably welded together.

Interconnecting of tubular elements 43c, 43d, 45c, and 45d is simply performed by the mounting of the wheels 47a. More specifically, each wheel 47a carries an upright member in the form of a bolt 77 which is adapted to extend through aligned holes (not labeled) provided in a respective tubular element 45c and 45d and a respective mounting plate 75 and then a nut 79 is used to secure the wheel assembly in place, as well as to rigidly interconnect the various elements of base unit 12a. Since wheels 47a preferably constitute castors, the wheels are permitted to rotate about an axis defined bolts 77.

As with the embodiment described in FIGS. 1–10, the embodiment of FIGS. 11–13 can be arranged in a compact configuration for shipping. In the embodiment of FIGS. 11–13, however, similar base units 12a are not intended to be stacked upon each other but rather the various shelves 40 are intended to be stacked upon the base tray 52, along with the various ladder sub-units, thereby providing for a compact arrangement. In addition, the embodiment of FIGS. 11–13 provides an entire frame which can readily be disassembled for ease of storage and at least initial shipping of the cart. In generally all other respects, however, the two cart embodiments disclosed function to transport and display items in similar, versatile manners.

It should be understood that various changes and modifications can be made to the specific embodiments disclosed herein which are provided for illustrative purposes only. The invention is not to be limited other than by the scope of the following claims.

We claim:

1. A display cart comprising a base unit comprising a structural framework arranged in a geometric pattern, said pattern providing a central opening in the base unit, said framework having an underside, an upper side, opposed ends and opposed sides;

wheels secured to and depending from the underside of the framework;

post supports secured at the opposed ends of the framework;

a first molded plastic tray having opposed integral side portions and being geometrically configured to fit within the central opening of the base unit with the side portions engaging the opposed sides of the framework;

a plurality of fasteners for securing the side portions of the first tray to the opposed sides of the framework;

a pair of ladder units each comprising spaced vertical posts and a plurality of vertically spaced horizontal bar elements rigidly connected to and extending between the posts, each of said ladder units being removably attached to said post supports at a respective one of the opposed ends of the framework;

at least one additional molded plastic tray having opposed side portions and being, at least dimensionally, substantially identical with said first plastic tray so as to be interchangeable therewith;

a pair of opposed tray support rods rigidly connected to and extending along the opposed side portions of the additional plastic tray, said rods including hooked end portions adapted to be removably secured to a selective said horizontal bar element of a respective one of said pair of ladder units whereby said additional plastic tray can be selectively supported on said opposed ladder units through said hooked end portions in both a substantial horizontal plane and angled with respect to the horizontal plane.

2. A display cart as claimed in claim 1, wherein said framework, support posts and rods constitute tubular members.

3. A display cart as claimed in claim 1, wherein said first and additional plastic trays are permanently secured to said framework and support rods, respectively.

4. A display cart as claimed in claim 3, wherein the opposed side portions of each of said first plastic tray and said additional plastic tray include upper horizontal sections and downwardly extending flange portions.

5. A display cart as claimed in claim 1, wherein the hooked end portions of said tray support rods include lower notches adapted to receive said horizontal bar elements enabling said hooked end portions to be freely dropped vertically over a respective said horizontal bar element.

6. A display cart as claimed in claim 1, wherein said tray support rods are formed of metal.

7. A display cart as claimed in claim 1, wherein each of said horizontal bar elements includes a main bar portion and terminal end portions, each said terminal end portion being attached to a respective said vertical post in a downwardly sloping manner.

8. A display cart as claimed in claim 1, further comprising a plurality of additional molded plastic trays and a plurality of pairs of opposed tray support rods, each pair of said rods being fixedly secured along opposed side portions of a respective one of said additional molded plastic trays, said plurality of additional molded trays being stackable with a respective pair of said rods being located above the opposed side portions of a respective one of said additional molded trays.

9. A display cart as claimed in claim 1, further comprising a plurality of bracket members secured at spaced locations adjacent the opposed ends on the underside of said framework for aligning said base unit with respect to post supports of a similar constructed second base unit when said base unit is stacked upon said second base unit.

10. A display cart as claimed in claim 1, wherein each of said ladder units is formed from multiple, interconnected ladder sub-units.

11. A shelf assembly comprising:

a molded, moveable plastic tray member having integral opposed horizontal side portions, end portions, and an apertured central portion extending between the opposed side and end portions; and a pair of opposed metallic tray support and reinforcing rods extending along and fixedly secured to said opposed horizontal side portions of the tray member so as to be fixedly associated with the tray member and being structurally configured to reinforce said tray member against vertical deflection, said rods including a cross-section configuration and end sections, each of said end sections including a downwardly opening hook section defining a notch in said cross-section configuration, each of said hook sections protecting beyond a respective end portion of the associated tray member;

said support and reinforcing rods each having an inner side facing the associated tray member; an outer side facing away from the associated tray member; and an upper side extending along the top surface of the support and reinforcing rod;

wherein each of the opposed side portions of said tray member includes an upper horizontal section and a downwardly extending flange portion, said horizontal section continuously overlying an upper side of an associated support and reinforcing rod along its length, and said flange portion extending along and adjacent an outer side of an associated support and reinforcing rod along its length; said tray including an integral bottom portion extending below the top surfaces of the associated support and reinforcing rods.

* * * * *